United States Patent [19]

Armond

[11] 4,426,672
[45] Jan. 17, 1984

[54] DEMAGNETIZER

[75] Inventor: Joseph A. Armond, River Grove, Ill.

[73] Assignee: Electro-Matic Products Co., Chicago, Ill.

[21] Appl. No.: 429,112

[22] Filed: Sep. 30, 1982

[51] Int. Cl.$^3$ .............................................. H01F 13/00
[52] U.S. Cl. ..................................... 361/145; 335/288
[58] Field of Search ................ 361/145; 335/288, 289, 335/290, 291

[56] References Cited

U.S. PATENT DOCUMENTS 3,579,053  5/1971  Littwin ................................ 361/145
3,729,658  4/1973  Voitov ................................. 361/145

Primary Examiner—Reinhard J. Eisenzopf
Attorney, Agent, or Firm—Paul H. Gallagher

[57] ABSTRACT

Continuous demagnetizing for a dial feeder grinder. The grinder has a rotating table, and a plurality of grinding heads for successively grinding workpieces put on the table and carried therepast. The workpieces are held on the table by a magnetic chuck, and to remove them, they must be demagnetized. The chuck is made up of wedge shape segments, and those segments are magnetized and demagnetized, in a rotation of the table, in putting the workpieces on, and removing them from, the table, both these steps being performed in a single rotation of the table. The magnetism of the chuck segments is controlled by collector rings arranged in sections around the table, and the chuck is provided with brushes engaging the collector ring segments for sequentially energizing the chuck segments, and, in conjunction therewith, controlling the demagnetizing steps.

7 Claims, 6 Drawing Figures

U.S. Patent  Jan. 17, 1984  Sheet 1 of 3  4,426,672
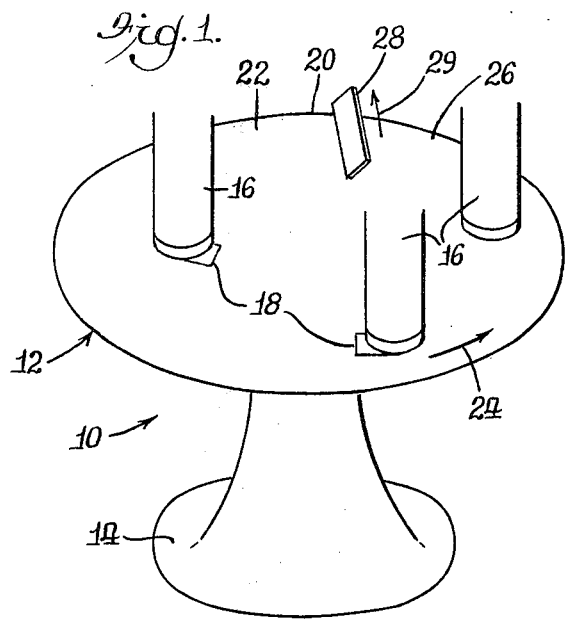
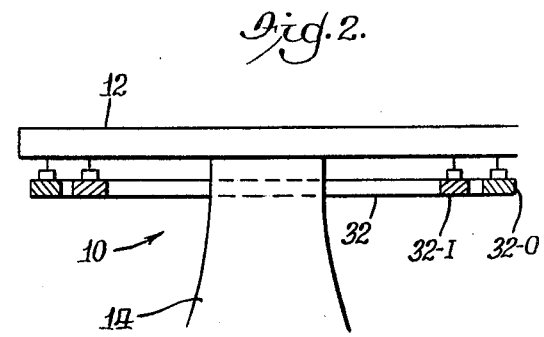
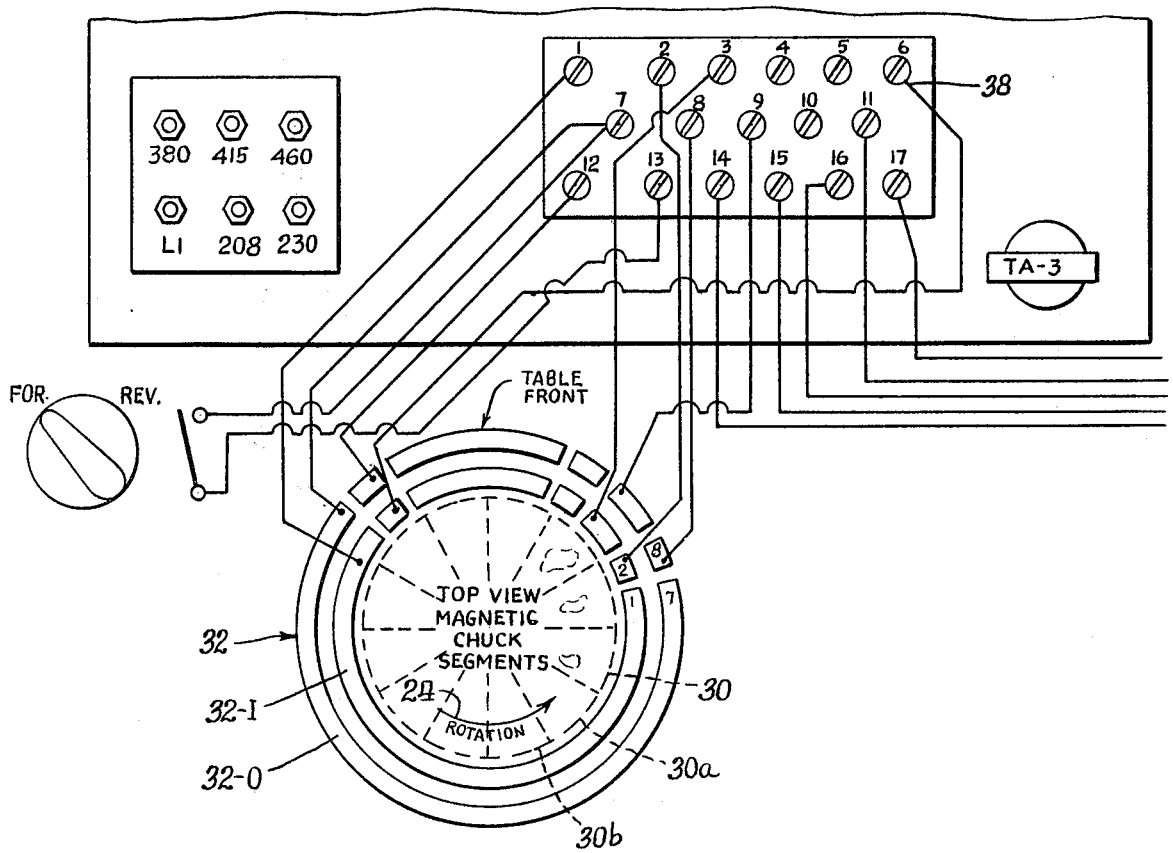
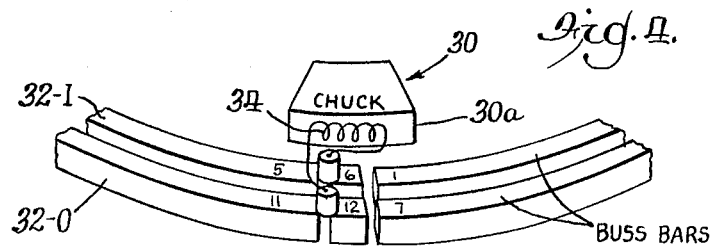

DEMAGNETIZER

OBJECTS OF THE INVENTION

A broad object of the invention is to provide novel apparatus and method for controlling the magnetism of magnetic chuck in a continuous operation of grinding workpieces held on the chuck.

Another object is to provide such apparatus and method wherein the level of magnetism utilized in holding the workpieces on the chuck is also utilized in controlling the demagnetizing steps.

Still another object is to provide such apparatus and method especially effective for maintaining gradual transition of levels of magnetism in the magnetizing and demagnetizing steps.

DESCRIPTION OF A PREFERRED EMBODIMENT

In the drawings:

FIG. 1 is a semi-diagrammatic view of a grinder to which to the present invention is applied:

FIG. 2 is a semi-diagrammatic view of the table of the grinder of FIG. 1, showing the rotatable table top in elevation and collector rings associated therewith in section;

FIG. 3 is a diagrammatic view of certain elements of the grinder and related electrical elements;

FIG. 4 is a semi-diagrammatic view, in perspective, of certain of the elements of the grinder;

Figure 5:
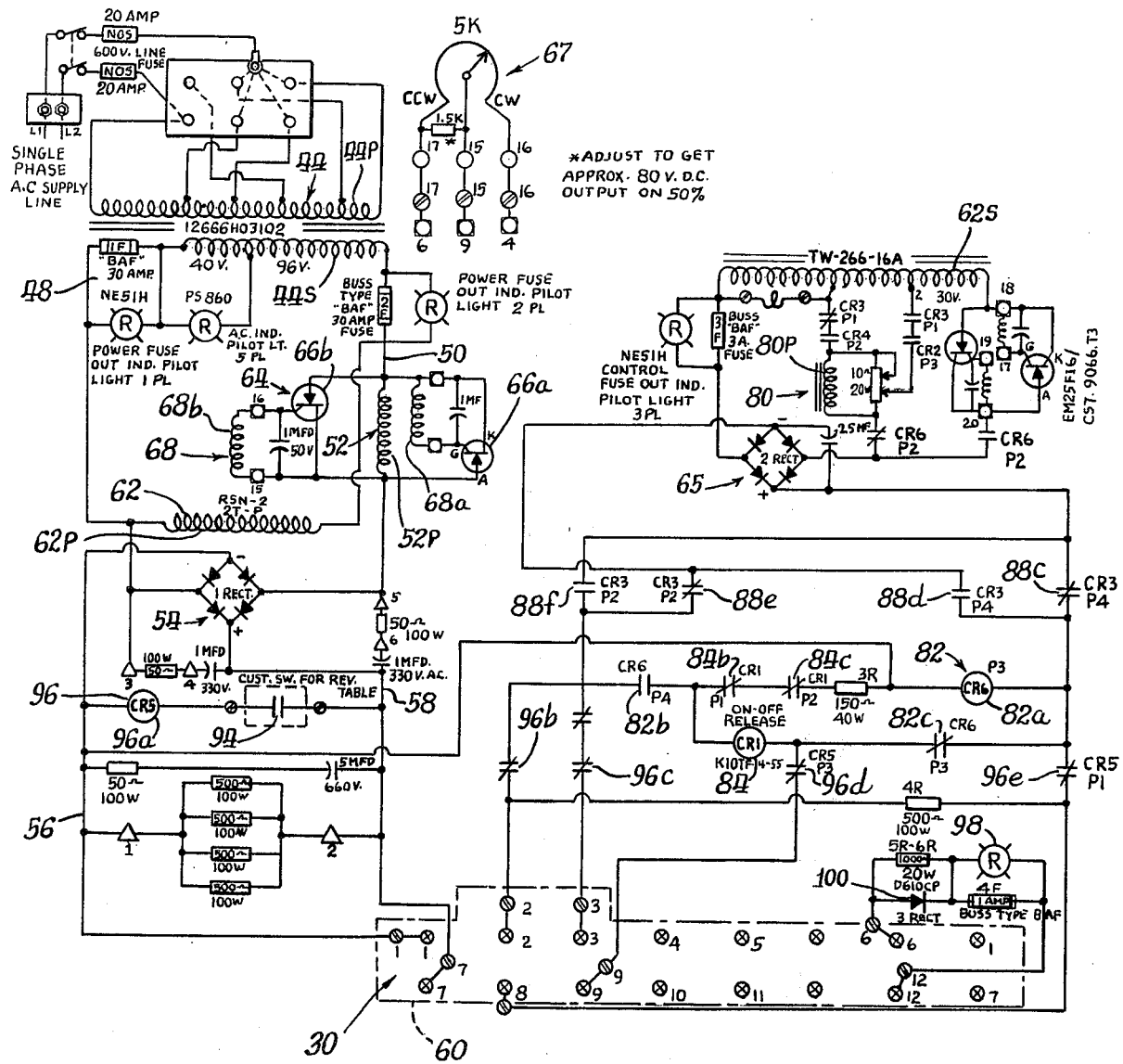
FIG. 5 is a diagram of a portion of the electrical circuit.

Referring in detail to the accompanying drawings, attention is directed first to FIGS. 1-4 illustrating, in semi-diagrammatic form, a grinder adapted to have the demagnetizer applied thereto. In the use of the grinder, the workpieces to be ground are held in place by a magnetic chuck, which of course magnetizes the work pieces held thereon, and in order to remove the workpieces from the chuck, they must be demagnetized, which the apparatus of the present invention effects.

Referring particularly to FIGS. 1 and 2, a grinder is indicated in its entirety at 10, which is of known type. The grinder has a rotatable table 12 mounted on a base 14, and a plurality of grinder heads 16 for grinding workpieces 18 placed on the table. The table has a front side 20 (FIG. 3) including a loading station 22 on which the workpieces 18 are placed. The table rotates in the direction indicated by the arrow 24, or counterclockwise, and the workpieces are carried around to a discharge station 26, and in this step, the pieces are demagnetized as referred to hereinbelow, and they are removed from the table by suitable means such as a deflector or scoop 28, in the direction indicated by the arrow 29. As the table rotates, the workpieces are carried under the grinder heads, and ground and then removed as stated.

The table incorporates magnetic chuck means 30 (FIGS. 3, 4) which is made up of a plurality of segments 30a, 30b, etc., of wedge shape or pie shape.

Associated with the table is a pair of collector rings 32, arranged concentrically and individually identified 32-I (inner) and 32-O (outer). These collector rings are each made up of a plurality of sections separated circumferentially, and bearing the individual numerals: in the ring 32-I the numbers are from 1-6 and in the ring 32-0, 7-12. These sections in each ring are mechanically and electrically separated from each other, but certain of them are inter-related as pointed out below.

Each of the segments of the chuck 30 is provided with a coil 34 (FIG. 4) to which are connected brushes 36, individually identified 36-I (inner) and 36-0 (outer) engaging the collector rings, inner and outer, respectively. The brushes 36 are of sufficient dimension circumferentially to bridge the gaps between the sections of the collector rings, operating at times for connecting both contiguous sections in circuit, as referred to below. However, these brushes are not of such circumferential dimension as to extend over two gaps so as to bridge three sections. Each of the chuck segments includes the coil 34 and the brushes, and the brushes are in constant contact with the collector rings, but the collector rings, or specifically the sections thereof, are put in circuit according to the operation of the various components thereof as described below.

The grinder with the chuck and collector rings and brushes, is of known kind.

FIGS. 3 and 4 show the collector rings 32 radially beyond the table and FIG. 2 shows them under the table, these representations are diagrammatic and the various elements may be physically located where desired.

FIG. 3 shows the electrical connections between the collector rings 32 and a mounting panel 38, and the specific relationship between the sections of the collector rings. These connections also appear in the circuit diagram at FIG. 5, bottom.

Reference is now made to the circuit diagram of FIG. 5. A suitable AC source is indicated at 40, leading to a distribution panel 42 and a main transformer 44.

In the description of the electrical circuit, the transformers will be identified by a main reference numeral, the primaries thereof by the same reference numeral with the letter P and the secondaries with the same reference numeral and the letter S, and in the case where there are more than one, with the subscripts 1, 2, 3, etc. In a similar manner, relays are identified by the main reference numeral, the coil thereof with the same reference numeral and the letter a and the contacts thereof with the same numeral plus the postscripts b, c, d, etc.

Leading from the secondary 44S are conductors 48, 50, the conductor 50 including the primary 52P of a transformer 52. The conductors 48, 50 lead to a first rectifier 54, and leading from the output of the rectifier are conductors 56, 58 which lead to certain of the collector rings 30 shown at the bottom of FIG. 5 and included in a dot-dash rectangle 60. These collector rings are individually identified with the numerals 1-6 and 7-12, as in FIG. 3 and referred to above. The conductors 56, 58 of FIG. 5 are also shown in the diagrammatic illustration of FIG. 3, and as shown in FIG. 5, these conductors being connected respectively with the ring sections 32, #1 and #7. When the brushes 36 are in engagement with the ring sections #1 and #7, the chuck coil 34 of the respective chuck segment 30a, with which the brushes are connected, is energized.

It will be noted from FIG. 3 that the sections #1, #of the rings 32 extend a great distance around the table and specifically more than half of that distance. This angular extent of the table represents the range where the grinding operation takes place, that is, the grinder heads shown in FIG. 1 all operate on the workpieces while the latter are traveling through that range. It will be understood that there may be any desired number of grinder heads, the present illustration of three being merely one example. The remaining portions of the collector rings 32 are made up of a plurality of sections, and these sections are utilized in control operations in demagnetizing the chuck segments and in other controls.

Considering any one chuck segment 30, while it is moving through the range represented by the ring sections #1 and #7, it does not enter into any demagnetizing function, but is merely energized by the engagement with those ring sections, but when they move beyond the end of those ring sections, and engage the succeeding ring sections #2 and #8, they enter into the series of steps for demagnetizing. As the brushes approach the end of the sections #1 and #7, they engage the succeeding sections #2 and #8 before moving off of the previous sections #1 and #7, and then bridge #1 and #2 in the inner ring, and #7 and #8 in the outer ring. These ring sections, #2 and #8, and also included in the rectangle 60 at the bottom of FIG. 5.

As the brushes engage the ring sections #2 and #8, the demagnetizing steps begin, as mentioned above, and in connection with these steps, attention is directed to other controls in the electrical circuit.

Connected across the secondary 44S (FIG. 5, left) is a primary coil 62P of a transformer 62.

The primary 52P, is controlled by a network 64 having back-to-back SRCs 66, individually identified 66a and 66b, respectively controlled by coils 68, individually identified 68a, 68b, controlling the gates of the SCRs, and themselves controlled by a potentiometer 67. Through this potentiometer and network, the voltage of the DC from the first rectifier 54 is adjusted through a suitable range, such as from 55 volts to 115 volts.

A transformer secondary 62S (FIG. 5, upper right) leads to a second rectifier 65, which provides potential, at different times, to the collector rings 32 (FIG. 5 bottom) as described further hereinbelow.

The potential provided to the second rectifier 65 is controlled by a transformer secondary 52S. Connected with the secondary 52S (FIG. 6) is a potentiometer 69 which in turn controls potentiometers 71, 70 which are manually controllable for the purpose of reversing the voltage in steps for demagnetizing. The secondary 52S senses the voltage of the primary 52P, and thereby controls the voltage output of the second rectifier 65, and maintains it identical with that of the first rectifier 54.

Figure 6:
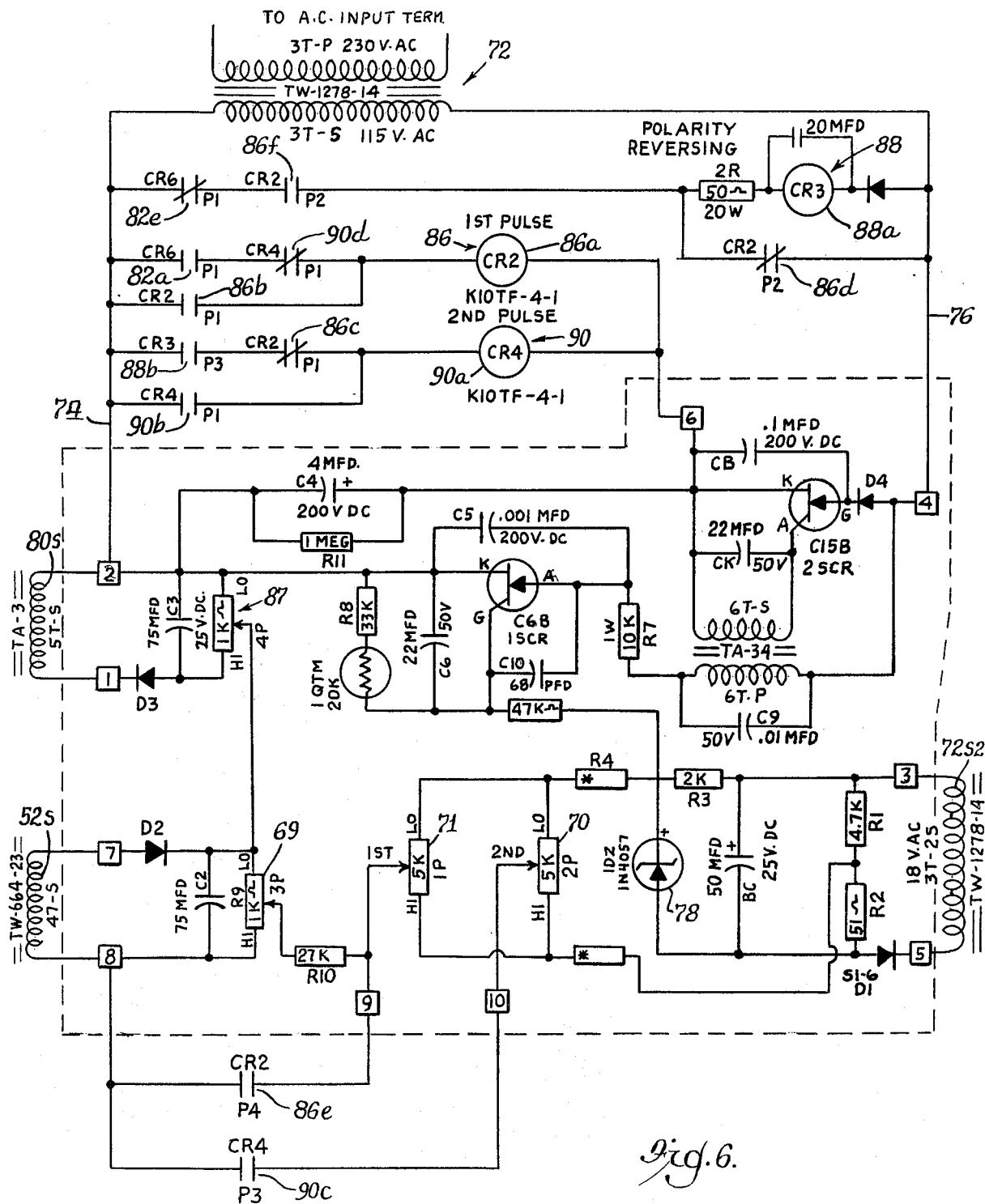
FIG. 6 is a diagram of another portion of the electrical circuit.

The circuit of FIG. 6 includes a transformer 72 leading from the source 40, and conductors 74, 76 leading from the secondary 72S1. Another secondary 72S2 is in circuit with the potentiometers 71, 70, and with a zener diode 78. Connected with the secondary 62S (FIG. 5, right top) is the primary 80P of a transformer 80 having a secondary 80S.

Through the controls just described, namely, the transformer 52 and the sensing of the voltage thereof by the secondary 52S and the secondary 72S2, the voltage of the transformer 62, and second rectifier 65 is maintained equal to the voltage of the first rectifier 54, it being recalled that the voltage of the latter can be varied between 55 volts and 115 volts by the potentiometer 67. Thus, in the demagnetizing, produced by reversing the voltage, the reversing step is of the proper voltage to perform the demagnetizing step according to the initial voltage of magnetizing established by the first rectifier 54.

In the operation of the apparatus, workpieces 18 on the grinder table are of course magnetized according to the particular chuck segments on which they rest. These segments are magnetized and demagnetized individually and, as stated above, each segment is energized throughout the extent of travel represented by the long collector ring sections #1 and #7. During this phase, the brushes remain in engagement with those ring sections, and as they leave those sections, they bridge #1 and #2, on the inner ring, and #7 and #8 on the outer ring. Upon these respective sections being connected and bridged, as the brushes engage the sections #2 and #8, a relay 82 (FIG. 5, lower right) is energized and it holds itself through contacts 82b. At this point the relay is energized from the first rectifier 54, and after it holds, through the contacts 82b, it receives the same potential from the second rectifier 65 as from the first rectifier 54. When the brushes leave the first sections #1 and #7, and they remain in engagement with the second sections #2 and #8, contact is broken with the first rectifier 54, and the relay 82 is energized solely by the second rectifier 65. In this position also, the chuck segment aligned with the sections #2 and #8 remains energized.

As the table continues to rotate and the brushes bridge the segments #2 and #3, and #8 and #9, the relay 84 is energized, and this de-energizes the relay 82, through contacts 84b and 84c.

The relay 82, upon being de-energized, energizes relay 86 (FIG. 6) through contacts 82c, and the relay 86 holds itself through contacts 86b.

Energization of the relay 86 closes contacts 86e and closes circuit through the potentiometer 71, and a reversing pulse is produced, of opposite polarity from the voltage applied in magnetizing the chuck. The setting of the potentiometer 71 is predetermined to produce a reverse voltage of the same value as the energizing voltage, as explained above, and for such period of field saturation that that reverse pulse produces a value of opposite polarity of 10%, as predetermined by the setting of the potentiometer 71 and a potentiometer 87.

The next step in demagnetizing takes place immediately, as follows: upon de-energization of the relay 82, it energized a relay 88, through contacts 82e and 86f. The relay 88 then reverses the contacts 88c, 88d, 88e, and 88f, and it closes the contacts 88b and energizes another relay 90 which holds itself through contacts 90b. A second demagnetizing pulse is initiated by this energization of the relay 90, this being in reverse direction relative to the first pulse by the reversal of the contacts 88c, 88d, 88e, and 88f. This second pulse is under the control of the potentiometers 70 and 87, which are set to effect the value mentioned, and the second pulse brings the magentism of the chuck up to 0 or "back" to 0.

This demagnetizing effect, through the reversal steps, takes place while the brushes are in engagement with the sections #3 and #9, and out of engagement with the sections #2 and #8. As a result of these steps in the operation of the circuit, the brushes (and the chuck segments and workpieces) had moved on to the sections #2 and #8 while they are at the same potential as the sections #1 and #7 and hence there is no arcing. The same thing takes place with respect to the brushes moving from the sections #2 and #8 to the sections #3 and #9, i.e., there is no arcing. Thereafter, when the brushes are in engagement only with, and bridging, the sections #2 and #3 and #8 and #9, does the demagnetizing take place and these sections are isolated from the other sections. Accordingly, the demagnetizing steps through the control of the relays 82, 86, 88 and 90 is controlled by the speed of the table. The speed of the table has to be such that it has to allow for demagnetization of the chuck and the complete operation of the demag control during the period that the magnetic chuck segment brushes are contacting #3 and #9. It is imperative that adjustments 71 and 70 with respect to 87 be set so that a complete releasing cycle of relays 86, 88 and 90 be completed before the brushes of that chuck segment contact #4 and #10, before the next adjacent segment brush contact #3 and #9 to initiate another demagnetizing cycle. The complete demagnetizing cycle takes place while the brushes are in engagement with the sections #3 and #9. As the brushes move off of the latter sections #3 and #9, they are at zero potential, as mentioned, and they ride onto the sections #4 and #10 which are not connected in circuit and are neutral, and serve as isolator bars. The brushes then move onto the sections #5 and #11 which are also neutral and the workpieces are stripped or swept off of the table by the blade 28 at the station 26. The chuck segments and the workpieces are thus at zero voltage, and they can be swept off the table with complete ease with minimum effort, and with virtually no damage to the workpieces or the table surface.

The grinder is provided with means for reversing the table for purposes other than demagnetizing. For example, if a workpiece is jammed, or for other reasons, and it is desirable to reverse the table, it is desired of course that the present apparatus be neutralized when such a step takes place. FIG. 3 shows a knob or switch 92 which is built into the grinder and is manually actuated for closing a switch 94 for so reversing the table. The present apparatus includes means connected with that switch for disabling the apparatus when the reversing step is performed. In FIG. 5 a relay 96 is connected in series with the switch 94 and across the first rectifier 54. Closing of this switch energizes that relay, 96, and opens the contacts 96b, 96c, 96d, 96e, opening the circuit to the collector rings. The connector ring sections #6 and #12, here referred to as a cancelling set, are connected in circuit with the switch 94, and when the brushes of any of the chuck segments engage the ring sections, they turn on an indicating pilot light 98 (FIG. 5) through a third rectifier 100.

I claim:

1. Demagnetizing apparatus for use with a table movable through a path including the following ranges, and movable through those ranges successively:
   (a) a neutral range constituting a station for loading and unloading,
   (b) a first range constituting a working range,
   (c) a second range constituting a demagnetizing range, and in return to
   (d) the neutral range,
the table having chuck means therein made up of a plurality of segments arranged in angular series and adapted for placement of workpieces thereon, and capable of moving the chuck segments and carrying the workpieces thereon along said path, comprising,
   a pair of collector rings associated with the table and each made up of a plurality of sections, the sections in each ring being electrically separated, the respective sections in the two rings being radially aligned and each two that are so radially aligned constituting a set,
   said sets of sections including a first set in said working range, extending a substantial angular distance of the table and being continuous throughout that distance,
   additional sets of sections in said demagnetizing range,
   each chuck segment including an energizing unit which itself includes a pair of brushes riding on respective collector rings, and each brush being capable of bridging two and only two adjacent sections in a ring,
   magnetizing control means energizable by contact engagement of a pair of brushes with the first set of ring sections and the magnetizing control means being thereby operable for energizing the respective chuck segment, and
   demagnetizing control means energizable by contact engagement of a pair of brushes with ring sections in said additional sets and the demagnetizing control means being thereby operable for demagnetizing the respective chuck segment.

2. Demagnetizing apparatus according to claim 1 and including,
   means for establishing potential in those ring sections in the demagnetizing range next succeeding the working range identical with that in the working range in response to movements of a set of brushes from the latter to the former, whereby to prevent arcing in that movement.

3. Demagnetizing apparatus according to claim 2 and including,
   means for manually adjusting the potential in the ring sections in the working range, and
   means responsive to that potential operable for maintaining identical potential in the ring sections.

4. Demagnetizing apparatus according to claim 3 wherein,
   said additional sets of sections in the demagnetizing range include two such sets,
   (a) an initial set next succeeding the sections in the working range, and
   (b) a demagnetizing set next succeeding the initial set,
   the apparatus including means operable for effecting a series of mutually reversing demagnetizing steps in the demagnetizing sections in response to the brushes in a chuck segment engaging the sections in the demagnetizing range and after the brushes have passed beyond the sections in the working range.

5. Demagnetizing apparatus according to claim 4 and including,
   a set of unmagnetized ring sections in said neutral range, and
   a set of unmagnetized ring sections between the demagnetizing range and the neutral range operable as isolator bars.

6. Demagnetizing apparatus according to claim 1 and wherein switch means is provided for reversing the table, and further wherein,
   the ring sections include a set of cancelling sections between the neutral range and the working range,
   means is included operable in response to actuation of said switch means for de-energizing the magnetizing control means and the demagnetizing control means, and
   signalling means is included actuated by a pair of brushes in engagement with said cancelling sections and actuation of said switch means.

7. Demagnetizing apparatus according to claim 6 wherein an electrical source is provided including a first rectifier, and wherein, a transformer is provided having a primary in series with the first rectifier and thereby operable for controlling that rectifier and consequently the ring sections in the working range, a second rectifier in circuit with said first set of ring sections in the demagnetizing range, and a secondary of said transformer in series with said second rectifier and thereby operable for maintaining potential on the second rectifier identical with that on the first rectifier and consequently the potential on said first set of sections in the magnetizing range identical with that on the set of sections in the working range.

* * * * *